(12) United States Patent
Oi et al.

(10) Patent No.: US 12,092,249 B2
(45) Date of Patent: Sep. 17, 2024

(54) CONNECTOR

(71) Applicant: TOGO SEISAKUSYO CORPORATION, Aichi (JP)

(72) Inventors: Shigeo Oi, Aichi (JP); Yuya Kido, Aichi (JP); Shohei Hosokawa, Aichi (JP)

(73) Assignee: TOGO SEISAKUSYO CORPORATION, Aichi (JP)

( * ) Notice: Subject to any disclaimer, the term of this patent is extended or adjusted under 35 U.S.C. 154(b) by 0 days.

(21) Appl. No.: 18/029,785

(22) PCT Filed: Sep. 30, 2021

(86) PCT No.: PCT/JP2021/036248
§ 371 (c)(1),
(2) Date: Mar. 31, 2023

(87) PCT Pub. No.: WO2022/075196
PCT Pub. Date: Apr. 14, 2022

(65) Prior Publication Data
US 2023/0366497 A1    Nov. 16, 2023

(30) Foreign Application Priority Data

Oct. 8, 2020    (JP) ................................ 2020-170443

(51) Int. Cl.
*F16L 37/14*    (2006.01)
(52) U.S. Cl.
CPC .................................. *F16L 37/14* (2013.01)
(58) Field of Classification Search
CPC ...... F16L 37/14; F16L 37/0885; F16L 37/144
See application file for complete search history.

(56) References Cited

U.S. PATENT DOCUMENTS

| | | |
|---|---|---|
| 2012/0056420 A1 | 3/2012 | Fansler |
| 2019/0293102 A1 | 9/2019 | Nezu |

(Continued)

FOREIGN PATENT DOCUMENTS

| | | | |
|---|---|---|---|
| DE | 202014000313 U1 | 4/2015 | |
| EP | 3364090 A1 * | 8/2018 | .......... F16L 37/0885 |

(Continued)

OTHER PUBLICATIONS

International Search Report received in PCT/JP2021/036248, date of mailing Nov. 30, 2021, 5 pages.

(Continued)

*Primary Examiner* — Zachary T Dragicevich
*Assistant Examiner* — James A Linford
(74) *Attorney, Agent, or Firm* — Hayes Soloway PC

(57) ABSTRACT

A connector includes a connector body and a retainer. The connector body includes a first opening and a second opening. The retainer includes a first leg and a second leg. A second end part of the retainer is temporarily locked at a temporary locking position that is further separated from a first end part of the retainer and is displaced in an insertion direction of a first pipe relative to a restriction position, which is a position to restrict detachment of the first pipe. When the first pipe is inserted into an insertion hole, temporary locking of the second end part is released, and the second end part moves to the restriction position due to a restoring force generated by elastic deformation of the retainer.

6 Claims, 16 Drawing Sheets

(56) References Cited

U.S. PATENT DOCUMENTS

2020/0173589 A1    6/2020  Choi et al.
2021/0301961 A1    9/2021  Ulrich
2021/0332923 A1 *  10/2021 Han .................. F16L 43/008

FOREIGN PATENT DOCUMENTS

| FR | 2883952 A1 | * | 10/2006 | ....... F02M 35/10144 |
|----|------------|---|---------|-----------------------|
| FR | 3059756 A1 | * | 6/2018  | ......... F16L 37/0885 |
| JP | 2002005375 A | | 1/2002 | |
| JP | 2003021287 A | * | 1/2003 | ............ F16L 37/088 |
| JP | 2004211891 A | | 7/2004 | |
| JP | 2009121668 A | | 6/2009 | |
| JP | 2013534993 A | | 9/2013 | |
| WO | 2017199718 A1 | | 11/2017 | |
| WO | WO-2019126447 A1 | * | 6/2019 | ............ F16L 37/084 |
| WO | 2020021179 A1 | | 1/2020 | |

OTHER PUBLICATIONS

PCT International Preliminary Report on Patentability and Written Opinion, received in PCT/JP2021/036248, date of issuance Mar. 28, 2023, 7 pages.

\* cited by examiner

CONNECTOR

CROSS-REFERENCE TO RELATED APPLICATIONS

This patent application claims priority from PCT Patent Application No. PCT/JP2021/036248 filed Sep. 30, 2021, which claims priority from Japanese Patent Application No. JP 2020-170443 filed Oct. 8, 2020. Each of these patent applications are herein incorporated by reference in their entirety.

TECHNICAL FIELD

The present disclosure relates to a connector.

BACKGROUND ART

Patent Documents 1 and 2 each disclose a connector. The connector couples two pipes together. The connector comprises a connector body and a horseshoe-shaped retainer. At least one of the pipes has a bulge portion. When the pipe having the bulge portion is inserted into the connector, the bulge portion pushes two legs of the retainer apart. After the bulge portion passes through the retainer, the two legs are closed. The closed two legs abut the bulge portion, thereby preventing the pipe from coming off.

PRIOR ART DOCUMENTS

Patent Documents

Patent Document 1: Japanese Unexamined Patent Application Publication No. 2002-005375
Patent Document 2: Japanese Unexamined Patent Application Publication No. 2004-211891

SUMMARY OF THE INVENTION

Problems to be Solved by the Invention

In conventional connectors, a change in a position of a retainer before and after coupling a pipe is small. Thus, it is difficult to determine whether the pipe is coupled by looking at the position of the retainer. In one aspect of the present disclosure, it is desirable to provide a connector that can facilitate determination of whether a pipe is coupled.

Means for Solving the Problems

One aspect of the present disclosure is a connector for coupling with a first pipe having a bulge portion and with a second pipe, the connector comprising a connector body and an elastically deformable horseshoe-shaped retainer.

The connector body comprises an insertion hole for insertion of the first pipe, a first opening communicating with the insertion hole from an outer peripheral surface of the connector body, a second opening communicating with the insertion hole from the outer peripheral surface of the connector body and opposed to the first opening, and a temporary locking portion.

The retainer comprises a first leg inserted in the first opening to abut a part of an outer peripheral surface of the first pipe, when coupled, on a side opposite to an insertion direction of the first pipe relative to the bulge portion, thereby restricting detachment of the first pipe; and a second leg inserted in the second opening to abut a part of the outer peripheral surface of the coupled first pipe on the side opposite to the insertion direction of the first pipe relative to the bulge portion, thereby restricting detachment of the first pipe.

A first end part of the first leg of the retainer is fixed to the connector body. The temporary locking portion is configured to temporarily lock a second end part of the second leg of the retainer at a temporary locking position that is further separated from the first end part and is displaced in the insertion direction of the first pipe relative to a restriction position, which is a position of the second end part when the retainer restricts detachment of the first pipe.

A configuration is made such that when the first pipe is inserted into the insertion hole in a state where the temporary locking portion temporarily locks the second end part, the bulge portion pushes the second leg outward, thereby releasing temporary locking of the second end part by the temporary locking portion, and the second end part moves to the restriction position due to a restoring force generated by elastic deformation of the retainer.

In the connector as one aspect of the present disclosure, the second end part is at the temporary locking position when the first pipe is not coupled. The second end part is at the restriction position when the first pipe is coupled. Thus, in the connector as one aspect of the present disclosure, a change in the position of the retainer before and after coupling the first pipe is large. As a result, a user can easily determine whether the first pipe is coupled by looking at the position of the retainer.

EXPLANATION OF REFERENCE NUMERALS

1 . . . connector; 3 . . . connector body; 3A . . . axially backward portion; 3B . . . axially forward portion; 5 . . . retainer; 7 . . . first pipe; 9 . . . leading end; 11 . . . bulge portion; 13 . . . leading end portion; 15 . . . large diameter portion; 17 . . . medium diameter portion; 19 . . . small diameter portion; 21 . . . protrusion; 23 . . . through hole; 25, 27 . . . stepped part; 29 . . . insertion hole; 31 . . . first opening; 33 . . . second opening; 33A . . . upward direction portion; 33B . . . downward direction portion; 34 . . . end face; 35 . . . stepped face; 41 . . . groove portion; 45 . . . wall portion; 47 . . . wall portion; 49 . . . abutment portion; 50 . . . O-ring; 52 . . . bushing; 55 . . . first leg; 57 . . . second leg; 59 . . . intermediate portion; 61 . . . first end part; 63 . . . second end part

MODE FOR CARRYING OUT THE INVENTION

An example embodiment of the present disclosure will be described with reference to the drawings.

1. Configuration of Connector 1

(1-1) Overall Configuration of Connector 1

Figure 1:
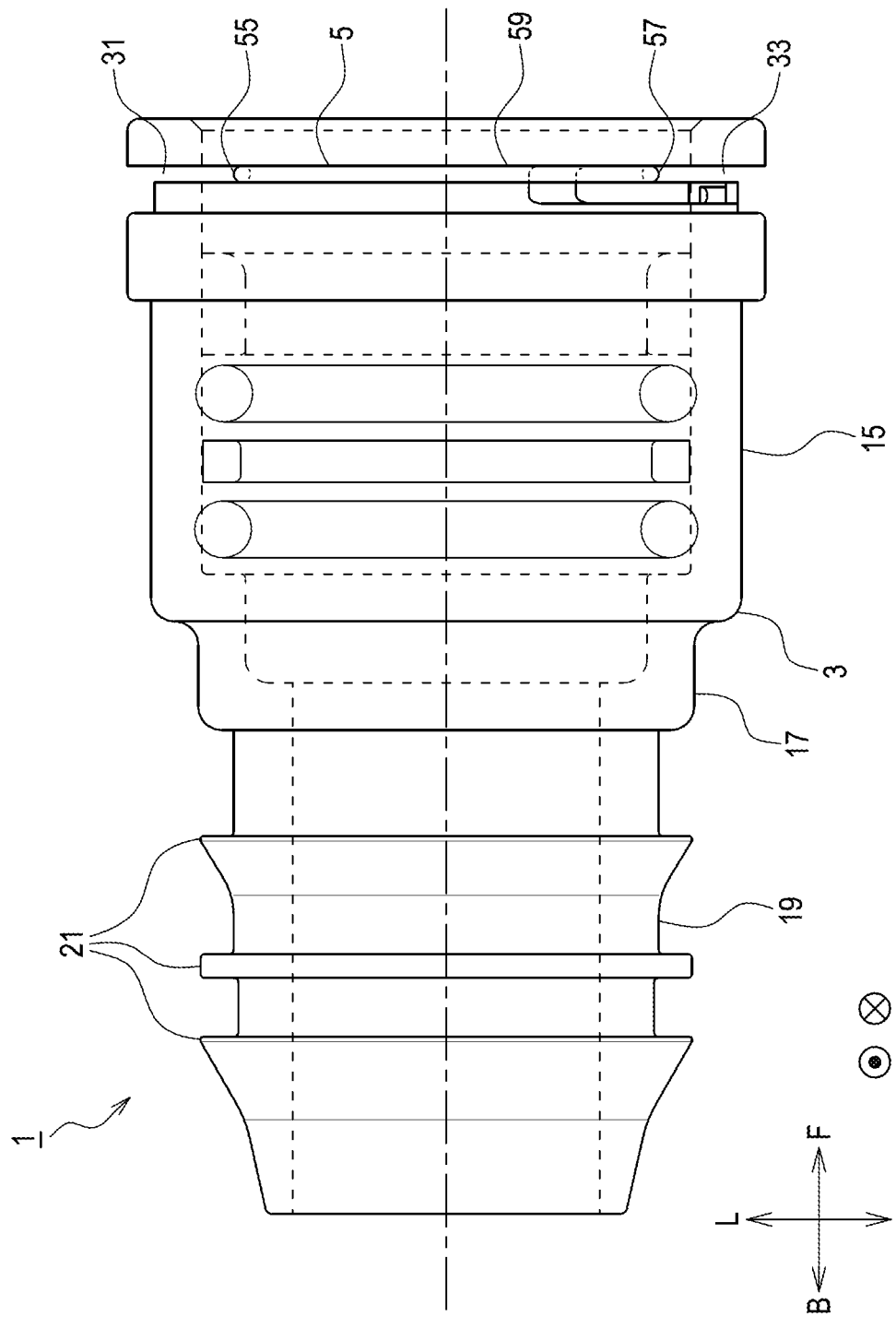
FIG. 1 is an explanatory diagram showing a configuration of a connector as seen from a viewpoint on a side of an upward direction U.
Figure 2:
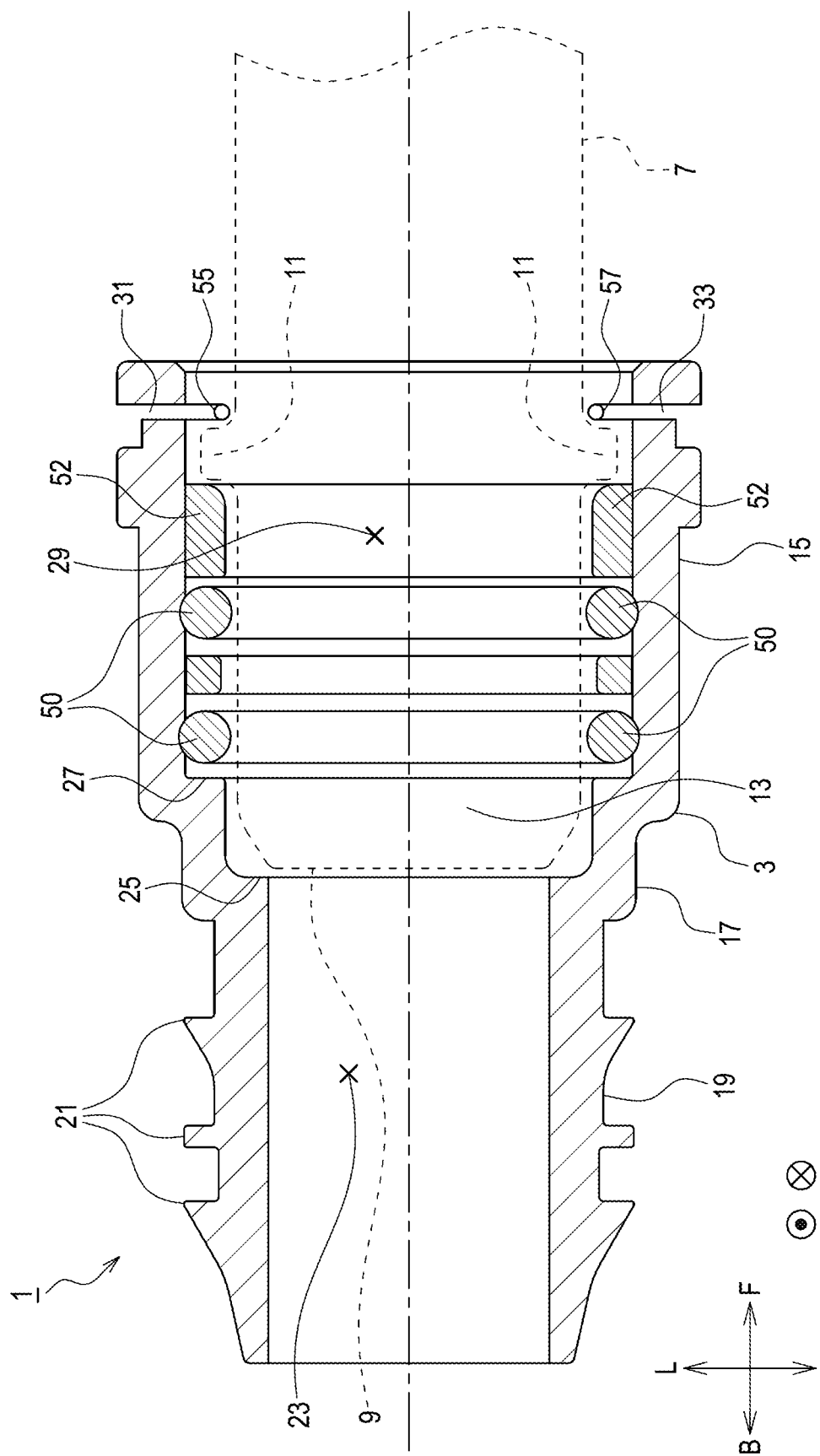
FIG. 2 is a sectional view showing a configuration of the connector and a first pipe coupled together as seen from the viewpoint on the side of the upward direction U.
Figure 3:
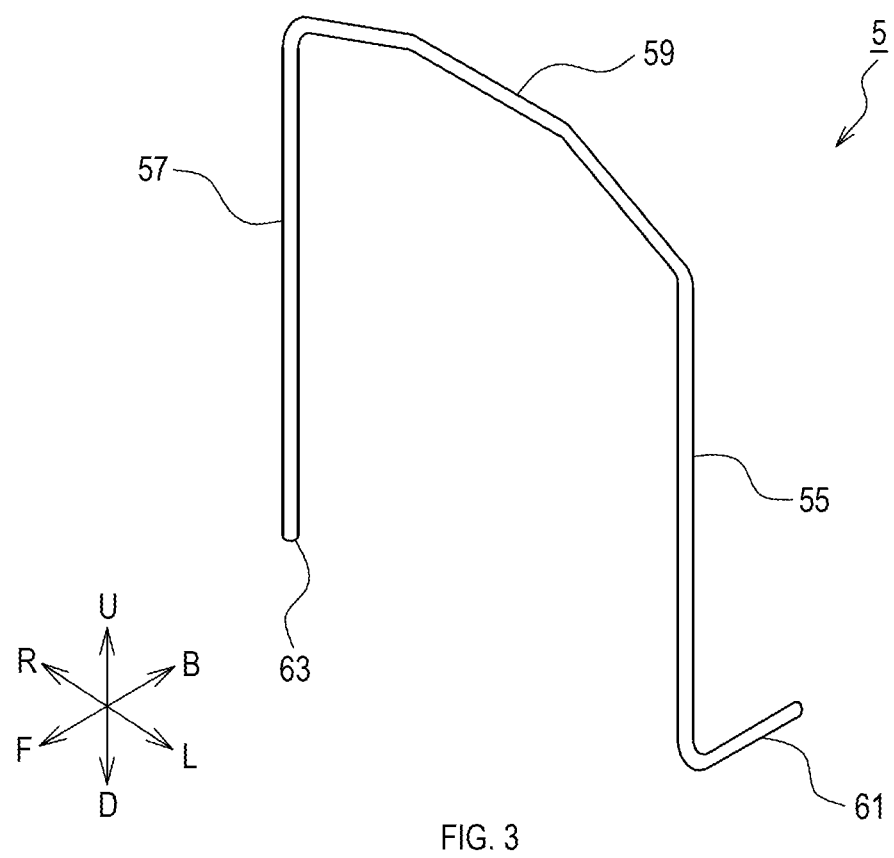
FIG. 3 is a perspective view showing a configuration of a retainer.

As shown in FIG. 1 to FIG. 2, a connector 1 comprises a connector body 3 and a retainer 5 (see also FIG. 3). The connector 1 is to be coupled with a first pipe 7 shown in FIG. 2 and FIG. 4. The connector 1 is also to be coupled with a not-shown second pipe. The second pipe is, for example, a resin tube.

Hereinafter, a leftward direction in FIG. 1 is referred to as an "axially backward direction B", and a rightward direction in FIG. 1 is referred to as an "axially forward direction F". Also, a front direction in FIG. 1 is referred to as an "upward direction U", and a depth direction in FIG. 1 is referred to as a "downward direction D". Further, a downward direction in FIG. 1 is referred to as a "rightward direction R", and an upward direction in FIG. 1 is referred to as a "leftward direction L".

(1-2) Configuration of First Pipe 7

Figure 4:
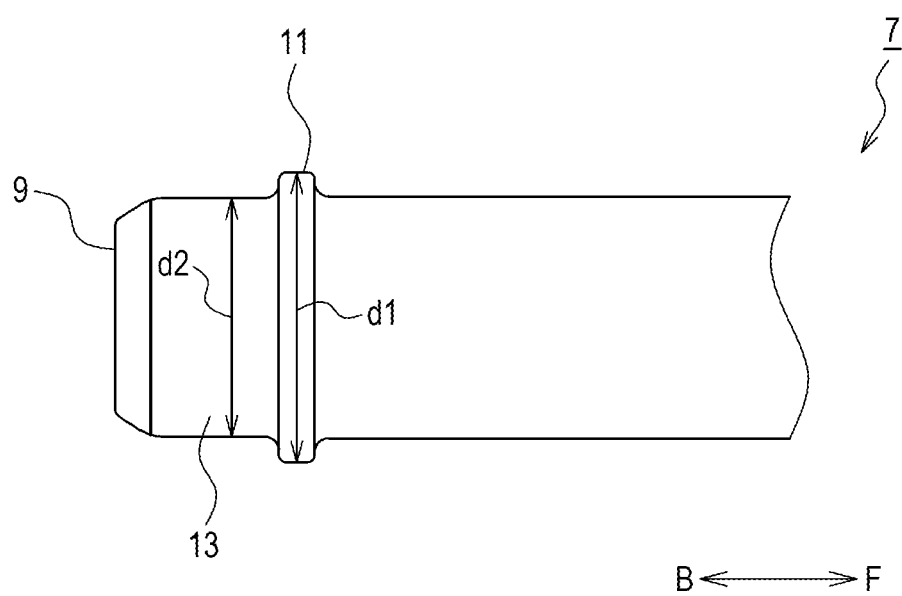
FIG. 4 is an explanatory diagram showing a configuration of the first pipe.

A configuration of the first pipe 7 will be described based on FIG. 4. The first pipe 7 has a hollow cylindrical basic shape. The first pipe 7 is open at its leading end 9. The first pipe 7 is also open at an end opposite to the leading end 9.

The first pipe 7 comprises a bulge portion 11 at a position displaced from the leading end 9 in the axially forward direction F. Directions indicated in relation to the first pipe 7 represent directions when the first pipe 7 is coupled to the connector 1.

An outside diameter of the bulge portion 11 is referred to as "d1". The outside diameter of the first pipe 7 is constant except at the bulge portion 11. The outside diameter except at the bulge portion 11 is referred to as "d2". The outside diameter d1 is greater than d2. In the first pipe 7, a portion located on a side of the leading end 9 is referred to as a "leading end portion 13". The leading end portion 13 includes the bulge portion 11. An outside diameter of the leading end portion 13 is d2 except at the bulge portion 11.

(1-3) Configuration of Connector Body 3

A description will be given of a configuration of the connector body 3 based on FIG. 1 to FIG. 2 and FIG. 5 to FIG. 11. The connector body 3 has a hollow cylindrical basic shape. The connector body 3 comprises a large diameter portion 15, a medium diameter portion 17, and a small diameter portion 19. In FIG. 5 to FIG. 8, illustration of the medium diameter portion 17 and the small diameter portion 19 is omitted. The large diameter portion 15 is located on a side of the axially forward direction F in the connector body 3. The large diameter portion 15 has a larger outside diameter than the medium diameter portion 17 and the small diameter portion 19.

The small diameter portion 19 is located on a side of the axially backward direction B in the connector body 3. The small diameter portion 19 has a smaller outside diameter than the large diameter portion 15 and the medium diameter portion 17. Annular protrusions 21 are formed on an outer peripheral surface of the small diameter portion 19. The second pipe is coupled to the connector 1 by being inserted over the small diameter portion 19. Since the protrusions 21 bite into an inner peripheral surface of the second pipe, the second pipe is less likely to come off the small diameter portion 19. The medium diameter portion 17 is located between the large diameter portion 15 and the small diameter portion 19.

As shown in FIG. 2 and FIG. 9 to FIG. 11, the connector body 3 has a through hole 23 therein. The through hole 23 extends in parallel with the axially backward direction B and the axially forward direction F, and penetrates the connector body 3.

As shown in FIG. 2, stepped parts 25, 27 are formed in an inner peripheral surface of the connector body 3, The stepped part 25 is formed in the medium diameter portion 17. The stepped part 27 is formed on the side of the axially backward direction B in the large diameter portion 15. The through hole 23 has the largest diameter on the side of the axially forward direction F from the stepped part 27. A part of the through hole 23 on the side of the axially forward direction F from the stepped part 27 is referred to as an "insertion hole 29". The insertion hole 29 has a diameter slightly larger than d1.

The through hole 23 has the smallest diameter, which is smaller than d2, on the side of the axially backward direction B from the stepped part 25. The through hole 23 has a diameter slightly larger than d2 and smaller than d1 in a portion between the stepped part 25 and the stepped part 27.

As shown in FIG. 1 to FIG. 2 and FIG. 3 to FIG. 11, the connector body 3 comprises a first opening 31 and a second opening 33. The first opening 31 is a groove formed on the side of the axially forward direction F and on a side of the leftward direction L of the large diameter portion 15. The groove has a width slightly larger than a diameter of a later-described first leg 55. The first opening 31 communicates from an outer peripheral surface of the large diameter portion 15 to the insertion hole 29. The first opening 31 extends along a circumferential direction of the large diameter portion 15.

The second opening 33 is a groove formed on the side of the axially forward direction F and on a side of the rightward direction R of the large diameter portion 15. The groove has a width larger than a diameter of a later-described second leg 57. The second opening 33 communicates from the outer peripheral surface of the large diameter portion 15 to the insertion hole 29. The second opening 33 is opposed to the first opening 31 across a center of the insertion hole 29. The second opening 33 extends along the circumferential direction of the large diameter portion 15.

Figure 6:
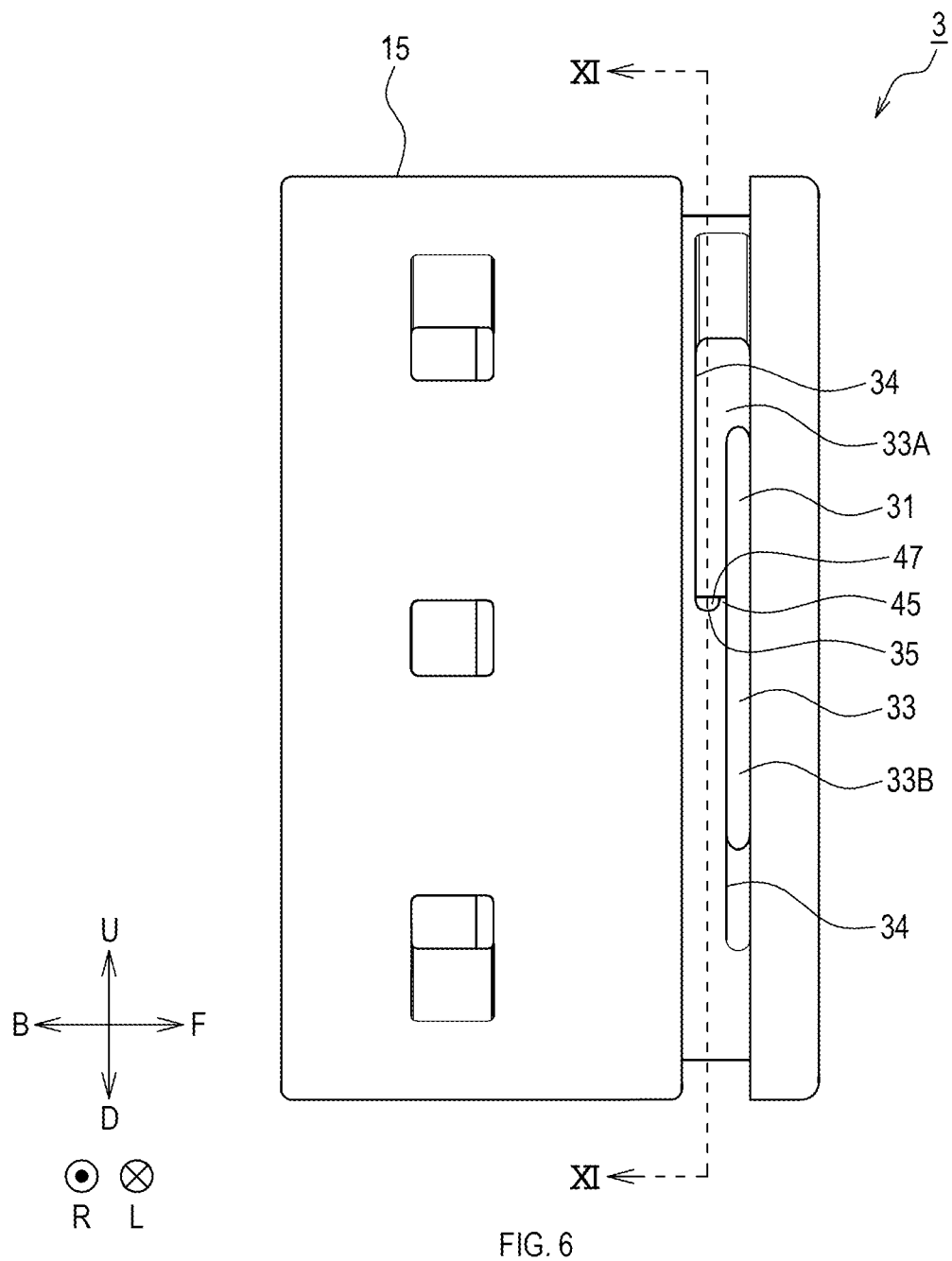
FIG. 6 is an explanatory diagram showing the configuration of the connector body as seen from a viewpoint on a side of a rightward direction R.

As shown in FIG. 6, an end face 34 of the second opening 33 on the side of the axially backward direction B comprises a stepped face 35. The stepped face 35 is a face orthogonal to the upward direction U and the downward direction D. A part of the end face 34 on a side of the upward direction U from the stepped face 35 is located more on the side of the axially backward direction B than a part of the end face 34 on a side of the downward direction D from the stepped face 35. Thus, a portion (hereinafter referred to as an "upward direction portion 33A") of the second opening 33 on the side of the upward direction U from the stepped face 35 has a larger width along the axially backward direction B and the axially forward direction F than that of a portion (hereinafter referred to as a "downward direction portion 33B") of the second opening 33 on the side of the downward direction D from the stepped face 35.

Figure 5:
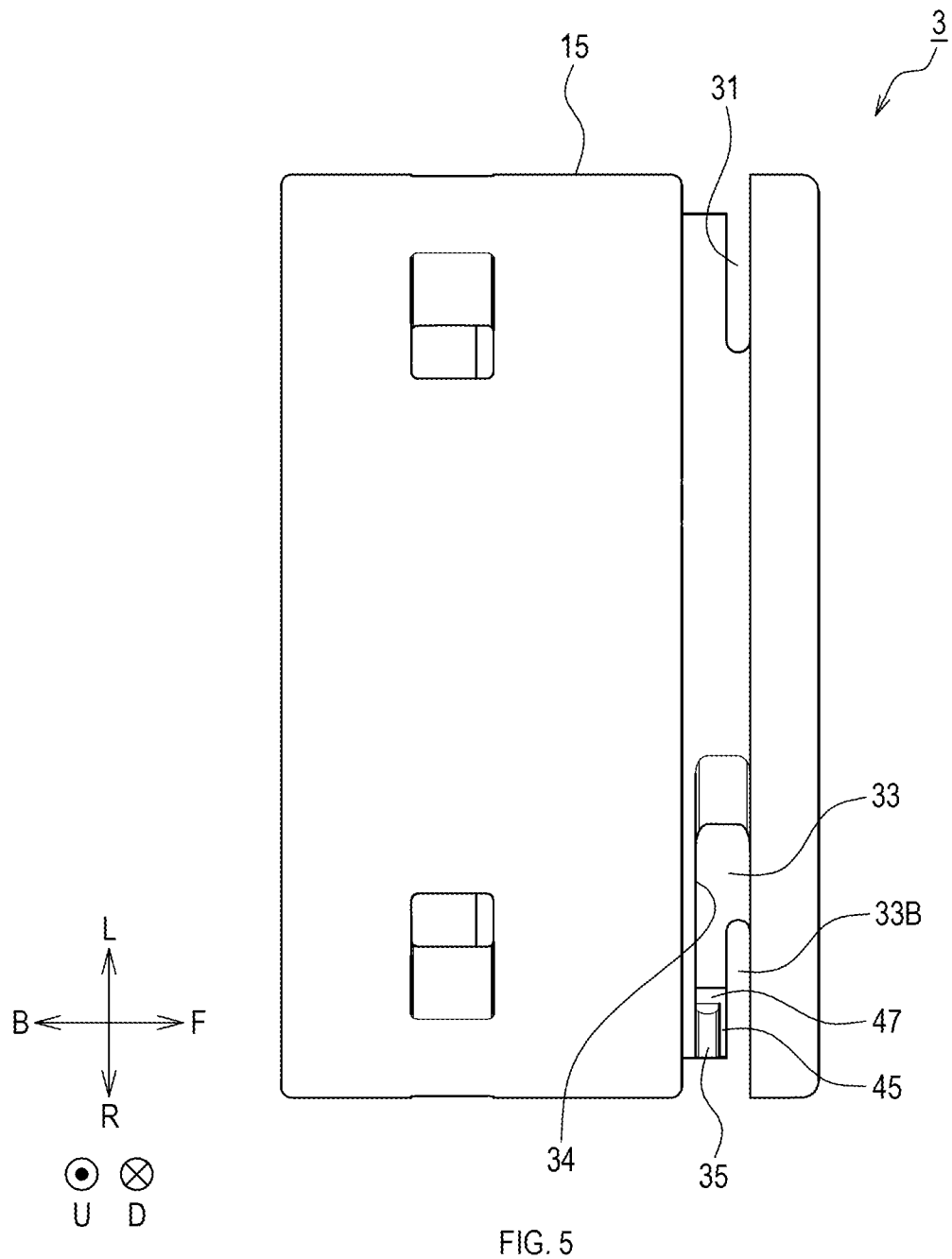
FIG. 5 is an explanatory diagram showing a configuration of a connector body as seen from the viewpoint on the side of the upward direction U.

As shown in FIG. 5 and FIG. 6, a wall portion 45 is formed on the side of the axially forward direction F of the stepped face 35. The wall portion 45 extends in the upward direction U more than the stepped face 35. Also, a wall portion 47 is formed on the side of the leftward direction L of the stepped face 35. The wall portion 47 extends in the upward direction U more than the stepped face 35. The stepped face 35, the wall portion 45, and the wall portion 47 correspond to a temporary locking portion. Temporary locking means locking temporarily. Locking means anchoring.

As shown in FIG. 2, O-rings 50 and a bushing 52 are inserted in the insertion hole 29. The O-rings 50 are located on the side of the axially backward direction B in the insertion hole 29. The bushing 52 is located more on the side of the axially forward direction F than the O-rings 50.

The first pipe 7 is inserted into the insertion hole 29 with the leading end 9 first, and is coupled to the connector 1. As shown in FIG. 2, when the first pipe 7 is coupled to the connector 1, the leading end 9 reaches a position close to the stepped part 25. The bulge portion 11 is brought into contact with a side surface of the bushing 52 from the side of the axially forward direction F. The leading end portion 13 is inserted in the O-rings 50 and the bushing 52. The bulge portion 11 is located slightly more on the side of the axially backward direction B than the first opening 31 and the second opening 33.

Figure 7:
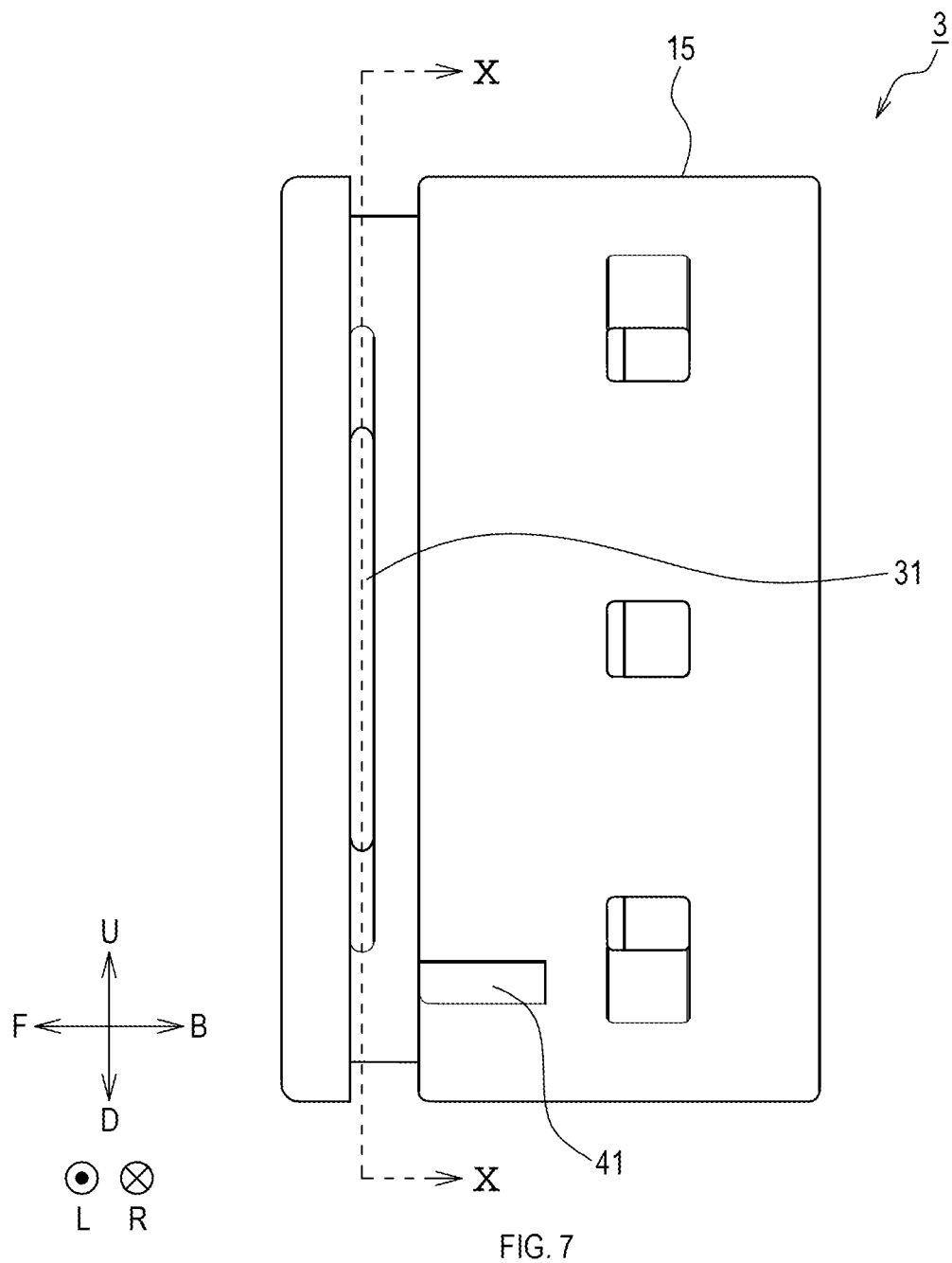
FIG. 7 is an explanatory diagram showing the configuration of the connector body as seen from a viewpoint on a side of a leftward direction L.
Figure 8:
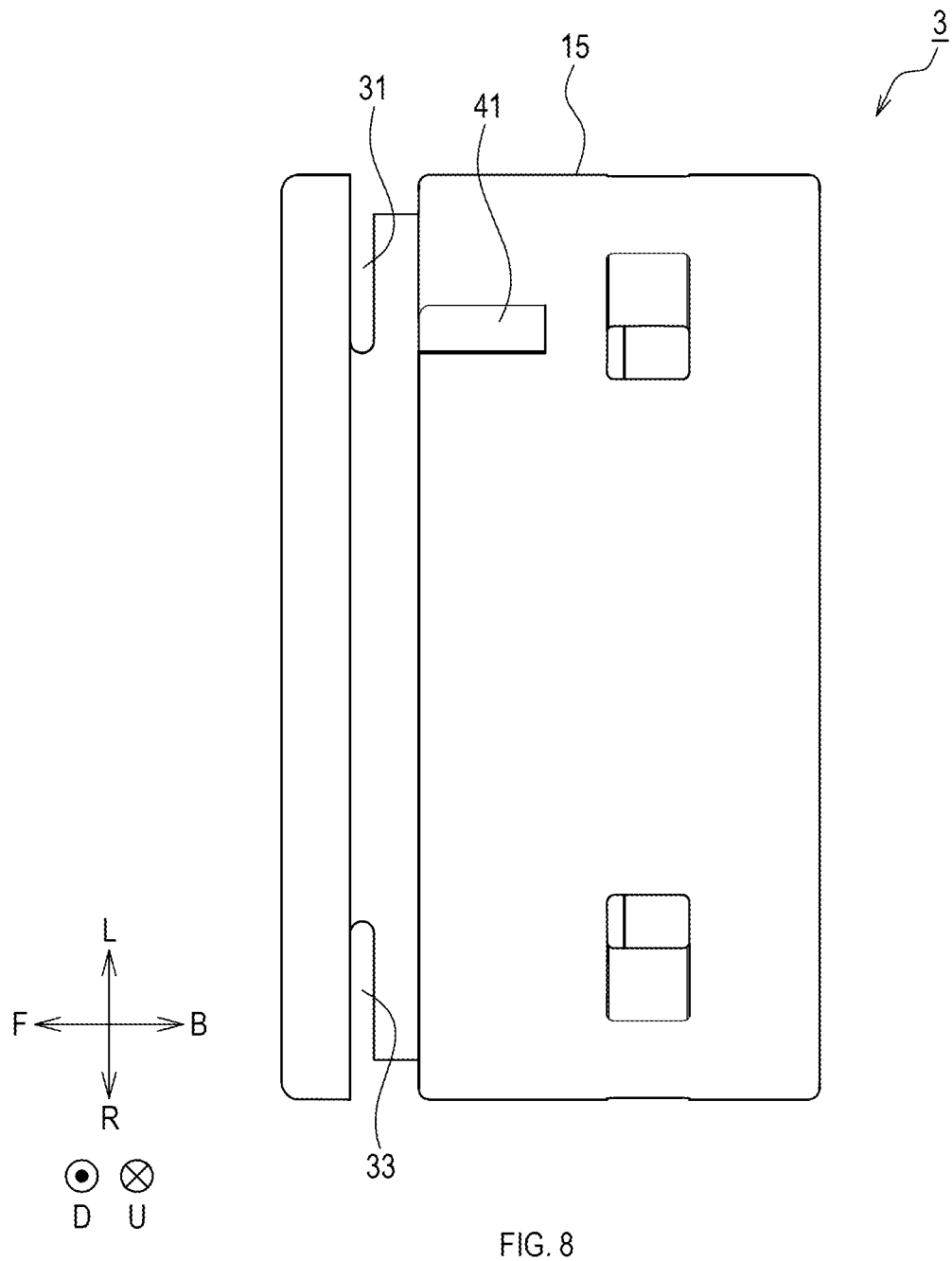
FIG. 8 is an explanatory diagram showing the configuration of the connector body as seen from a viewpoint on a side of a downward direction D.
Figure 9:
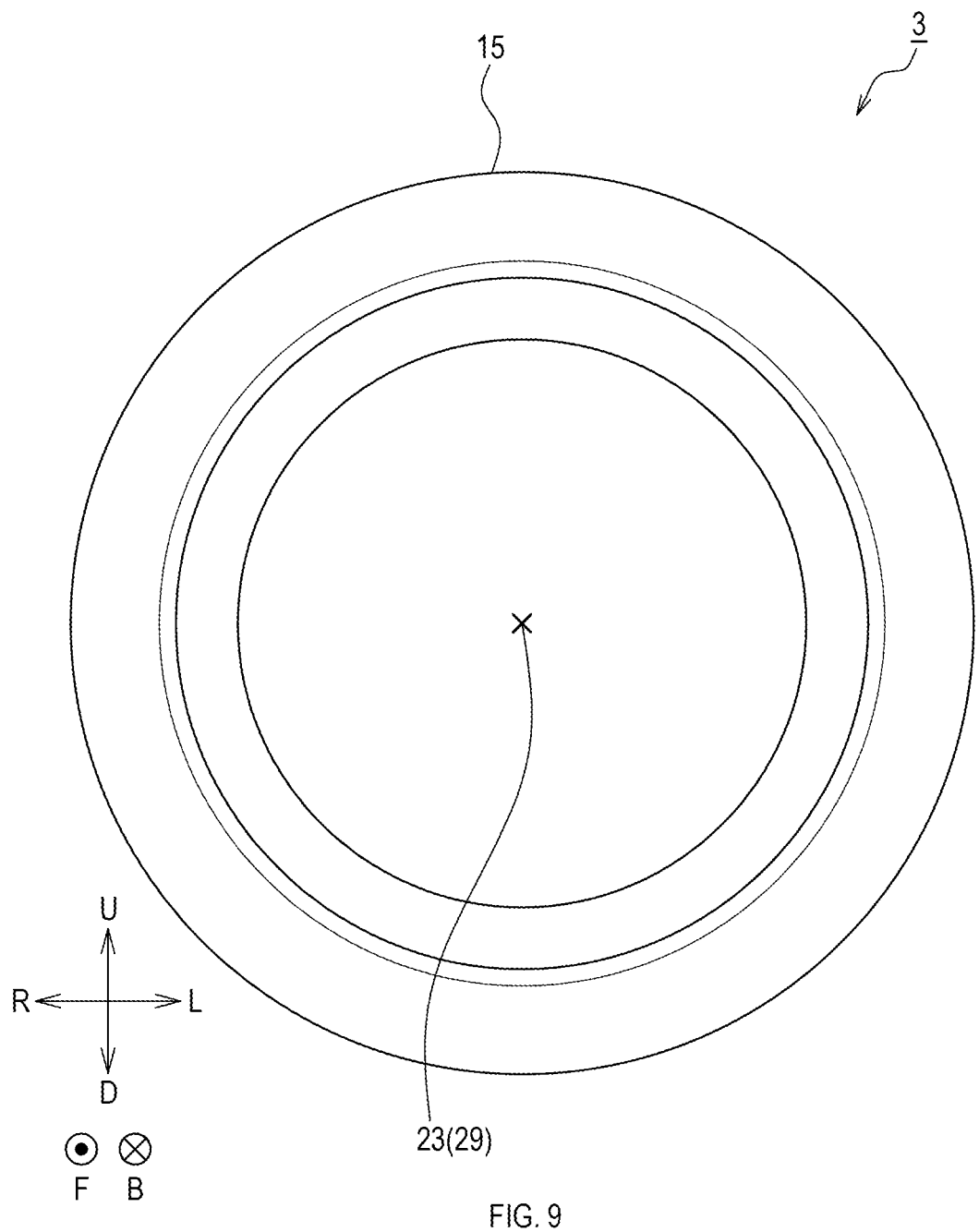
FIG. 9 an explanatory diagram showing the configuration of the connector body as seen from a viewpoint on a side of an axially forward direction F.
Figure 10:
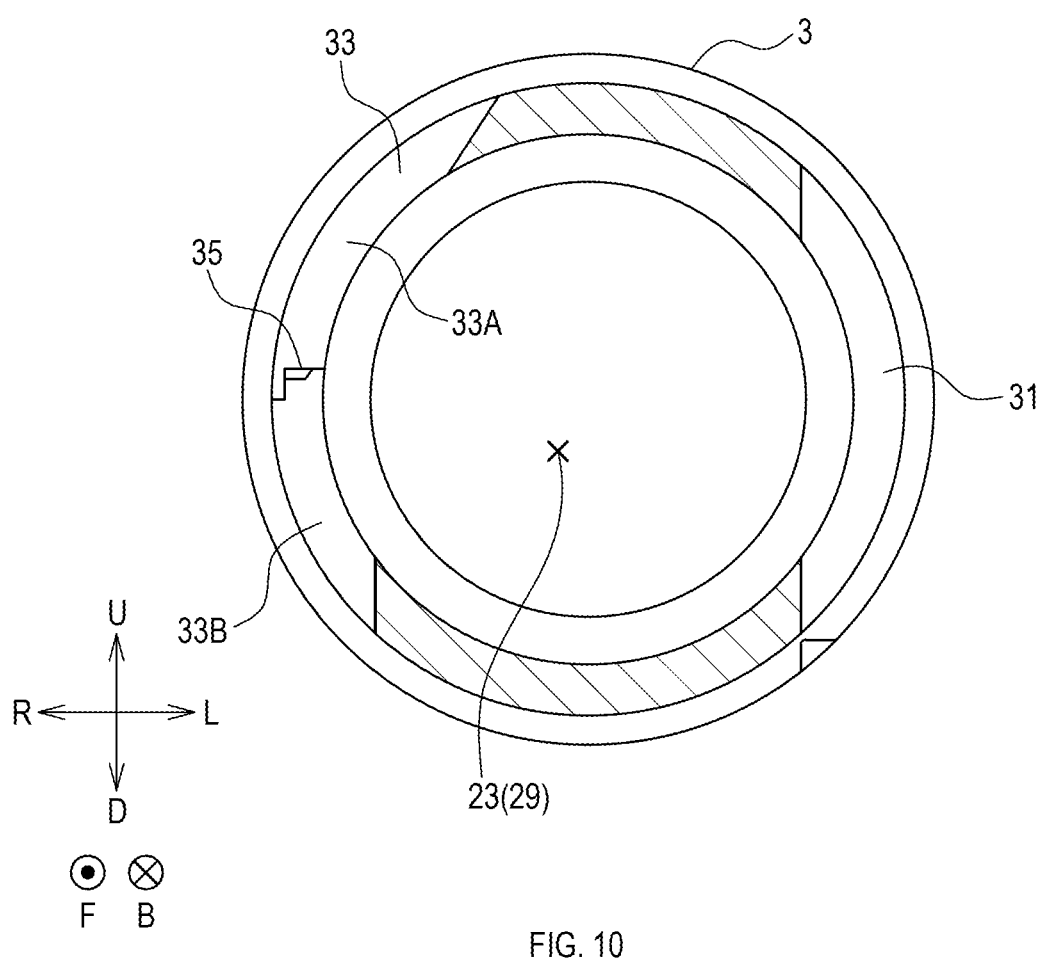
FIG. 10 is a sectional view in an X-X cross-section in FIG. 7.
Figure 11:
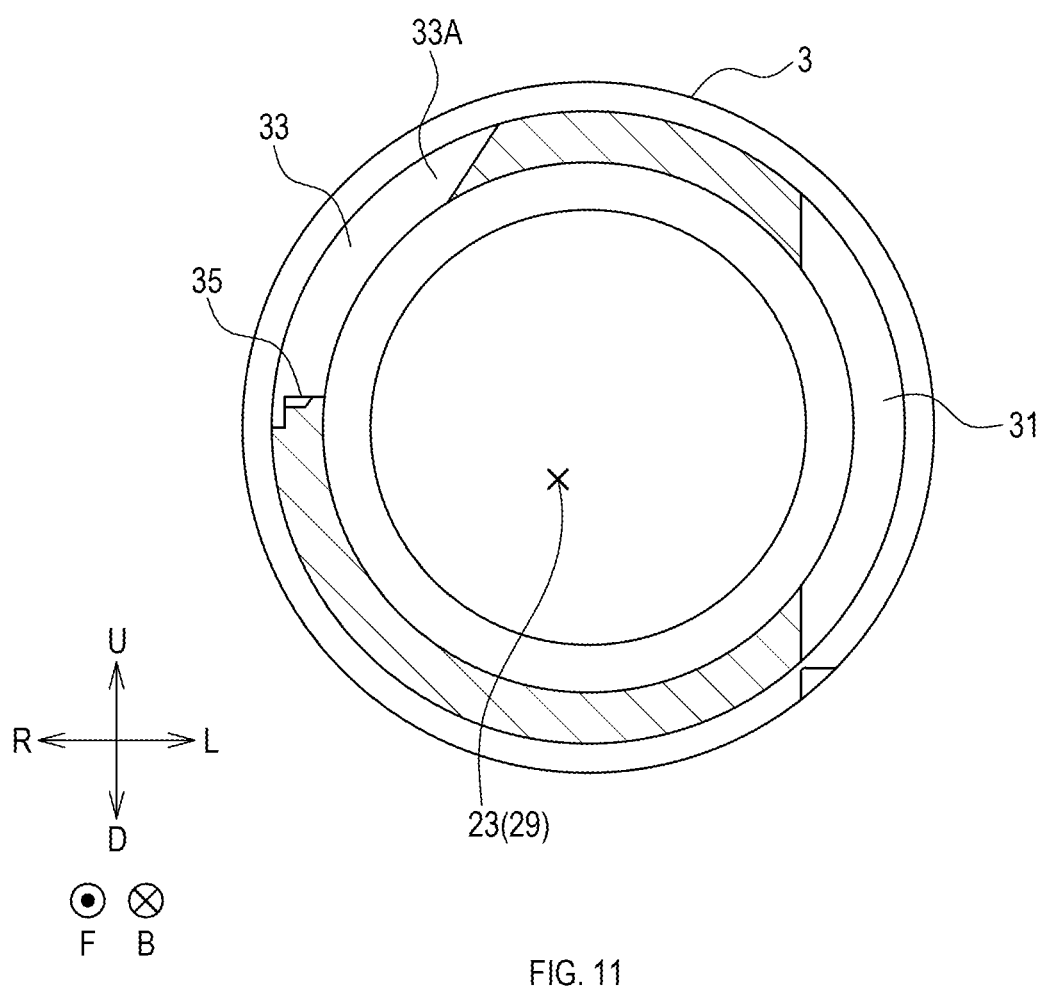
FIG. 11 is a sectional view in an XI-XI cross-section in FIG. 6.

As shown in FIG. 7 and FIG. 8, a groove portion 41 is formed in the outer peripheral surface of the large diameter portion 15 on the side of the downward direction D and on the side of the leftward direction L. The groove portion 41 extends in parallel with the axially forward direction F and the axially backward direction B.

(1-4) Configuration of Retainer 5

A description will be given of a configuration of the retainer 5 based on FIG. 3. The retainer 5 is configured with a wire rod of, for example, metal. The retainer 5 is made of an elastically deformable material. The retainer 5 has a horseshoe shape. The retainer 5 comprises the first leg 55, the second leg 57, and an intermediate portion 59.

The wire rod configuring the retainer 5 has a circular or elliptical cross section. Thus, the first leg 55, the second leg 57, and the intermediate portion 59 each have a circular or elliptical cross section. The cross section means a section orthogonal to a longitudinal direction.

The first leg 55 extends from the intermediate portion 59 in the downward direction D, is bent in an L shape in a vicinity of its end, and then extends in the axially backward direction B. A part of the first leg 55 extending in the axially backward direction B is referred to as a "first end part 61".

The second leg 57 extends from the intermediate portion 59 in the downward direction D. An end of the second leg 57 is referred to as a "second end part 63". The intermediate portion 59 is a portion connecting the first leg 55 and the second leg 57.

As shown in FIG. 1 and FIG. 2, the first leg 55 is inserted in the first opening 31. As shown in FIG. 2, while the connector 1 is coupled with the first pipe 7, the first leg 55 proceeds in a central direction of the insertion hole 29, and is located at a position overlapping the bulge portion 11 when seen from the side of the axially forward direction F. The first leg 55 is located more on the side of the axially forward direction F than the bulge portion 11. The first leg 55 abuts an outer peripheral surface of the leading end portion 13. The leading end portion 13 corresponds to a portion forward of the bulge portion 11. The first leg 55 restricts detachment of the first pipe 7 coupled with the connector 1.

As shown in FIG. 1 and FIG. 2, the second leg 57 is inserted in the second opening 33. As shown in FIG. 2, while the connector 1 is coupled to the first pipe 7, the second leg 57 proceeds in the central direction of the insertion hole 29, and is located at a position overlapping the bulge portion 11 when seen from the side of the axially forward direction F. The second leg 57 is located more on the side of the axially forward direction F than the bulge portion 11. The second leg 57 abuts the outer peripheral surface of the leading end portion 13. The second leg 57 restricts detachment of the first pipe 7 coupled with the connector 1.

While the connector 1 is coupled with the first pipe 7, the intermediate portion 59 abuts a part of the outer peripheral surface of the large diameter portion 15 on the side of the upward direction U.

2. Operation of Retainer 5

A description will be given of an operation of the retainer 5 when the first pipe 7 is coupled to the connector 1 based on FIG. 12 to FIG. 15.

Figure 12:
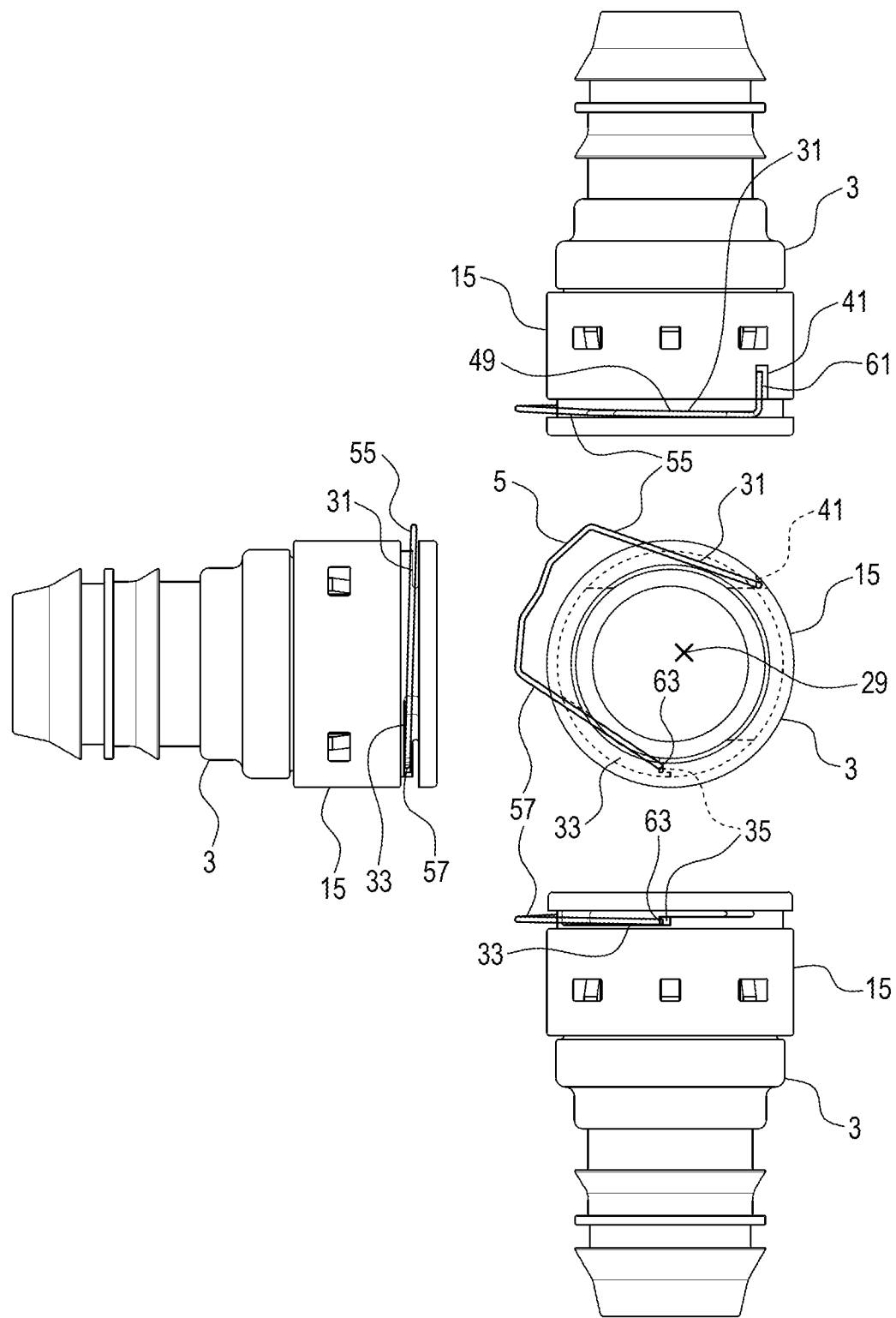
FIG. 12 is an explanatory diagram showing a configuration of the connector body and the retainer in a state where the first pipe is not coupled.

First, as shown in FIG. 12, the retainer 5 is mounted to the connector body 3. At this point, the first leg 55 is inserted in the first opening 31. The first end part 61 is inserted in the groove portion 41. The first end part 61 is fixed to the connector body 3. The first end part 61 does not move along the axially forward direction F or the axially backward direction B relative to the connector body 3. The first end part 61 does not move in a radial direction of the insertion hole 29 relative to the connector body 3.

The second leg 57 is inserted in the second opening 33. The second end part 63 is placed on the stepped face 35. The second end part 63 is surrounded by the wall portion 45 and the wall portion 47 shown in FIG. 5 and FIG. 6. A position of the second end part 63 in this situation is referred to as a "temporary locking position". The temporary locking position is a position that is further separated from the first end part 61 and is displaced in the axially backward direction B relative to a later-described restriction position. The axially backward direction B corresponds to an insertion direction of the first pipe 7.

When the second end part 63 is moved toward the stepped face 35 in order to place the second end part 63 on the stepped face 35, the retainer 5 does not move as a whole. It is because the first leg 55 abuts an abutment portion 49 shown in FIG. 12 and thereby inhibits movement of the retainer 5 when the second end part 63 is moved toward the stepped face 35. The abutment portion 49 is a part of an end surface of the first opening 31 on the side of the axially backward direction B.

Since the retainer 5 does not move as a whole when the second end part 63 is moved toward the stepped face 35, the retainer 5 is elastically deformed. The elastic deformation is caused in such a manner that the second end part 63 is distanced from the first end part 61, and the second end part 63 is moved in the axially backward direction B, while the first end part 61 is fixed. The axially backward direction B corresponds to the insertion direction of the first pipe 7. Also, the elastic deformation is caused in such a manner that the first leg 55 and the second leg 57 are opened. Further, the elastic deformation is caused in such a manner that the second end part 63 turns around an axis parallel to the axially forward direction F and the axially backward direction B, with the first end part 61 serving as a center.

Since the retainer 5 is elastically deformed, a restoring force is generated in the second end part 63. A direction of the restoring force is a direction to cause the second end part 63 to approach the first end part 61 and move in the axially forward direction F. Also, the direction of the restoring force is a direction to close the first leg 55 and the second leg 57. Further, the direction of the restoring force is a direction of turning of the second end part 63 around the axis parallel to the axially forward direction F and the axially backward direction B, with the first end part 61 serving as a center. The direction of the turning is opposite to the direction of the turning when the retainer 5 is elastically deformed.

However, since the second end part 63 is surrounded by the wall portion 45 and the wall portion 47 shown in FIG. 5 and FIG. 6, the second end part 63 does not come off the stepped face 35 even when the restoring force is generated in the second end part 63 unless the second leg 57 is pushed outward by the bulge portion 11 as described later.

Figure 13:
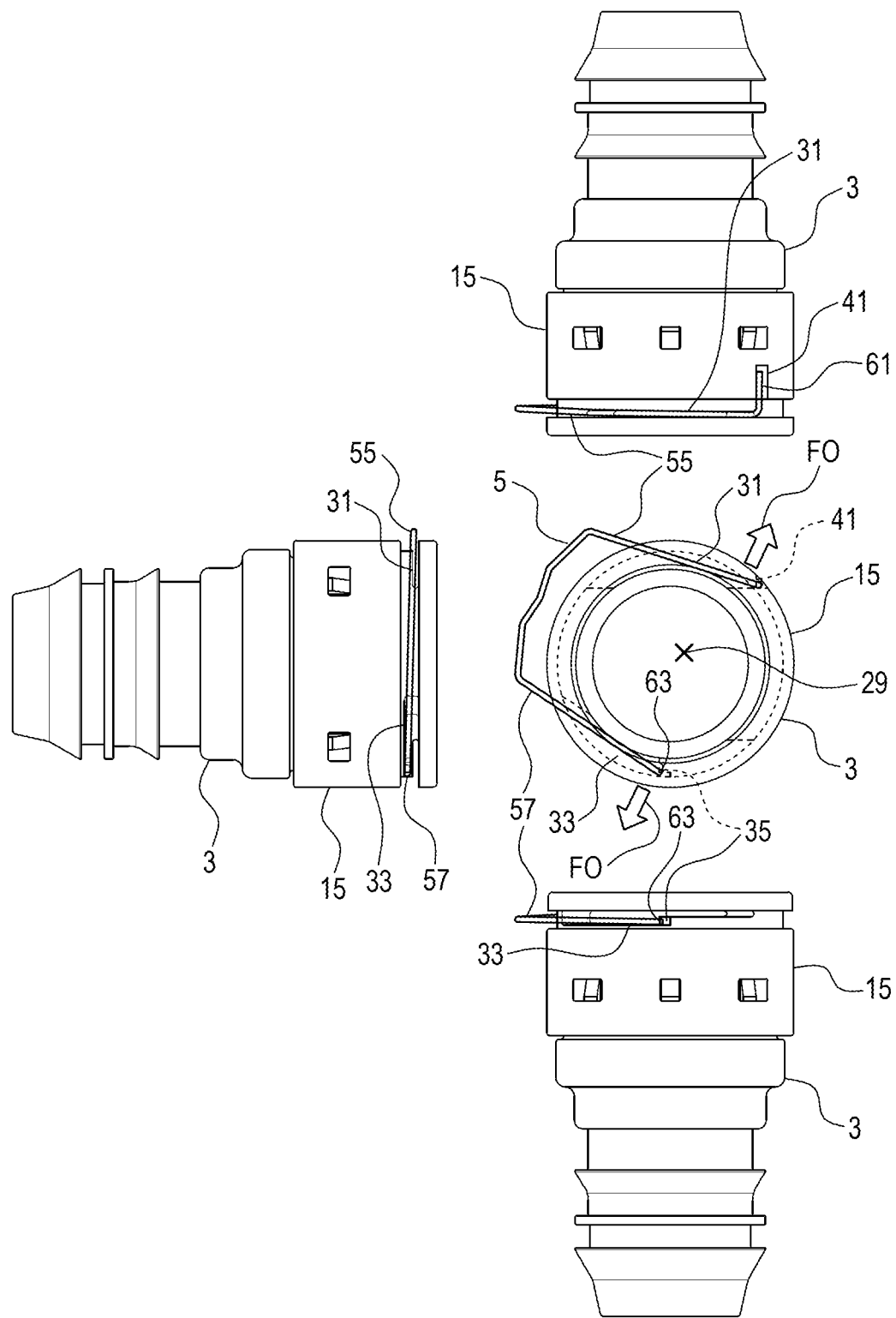
FIG. 13 is an explanatory diagram showing the configuration of the connector body and the retainer in a state where a bulge portion applies a radially outward force to a first leg and a second leg.

Next, the first pipe 7 is inserted into the insertion hole 29. As shown in FIG. 13, the bulge portion 11 applies a radially outward force FO to at least the second leg 57. The retainer 5 is elastically deformed further, and at least the second leg 57 moves radially outward. The second end part 63 is allowed to climb over the wall portion 45 and the wall portion 47 shown in FIG. 5 and FIG. 6, and to be separated from the stepped face 35. Climbing over the wall portion 45 and the wall portion 47 by the second end part 63 corresponds to release of temporary locking.

Figure 14:
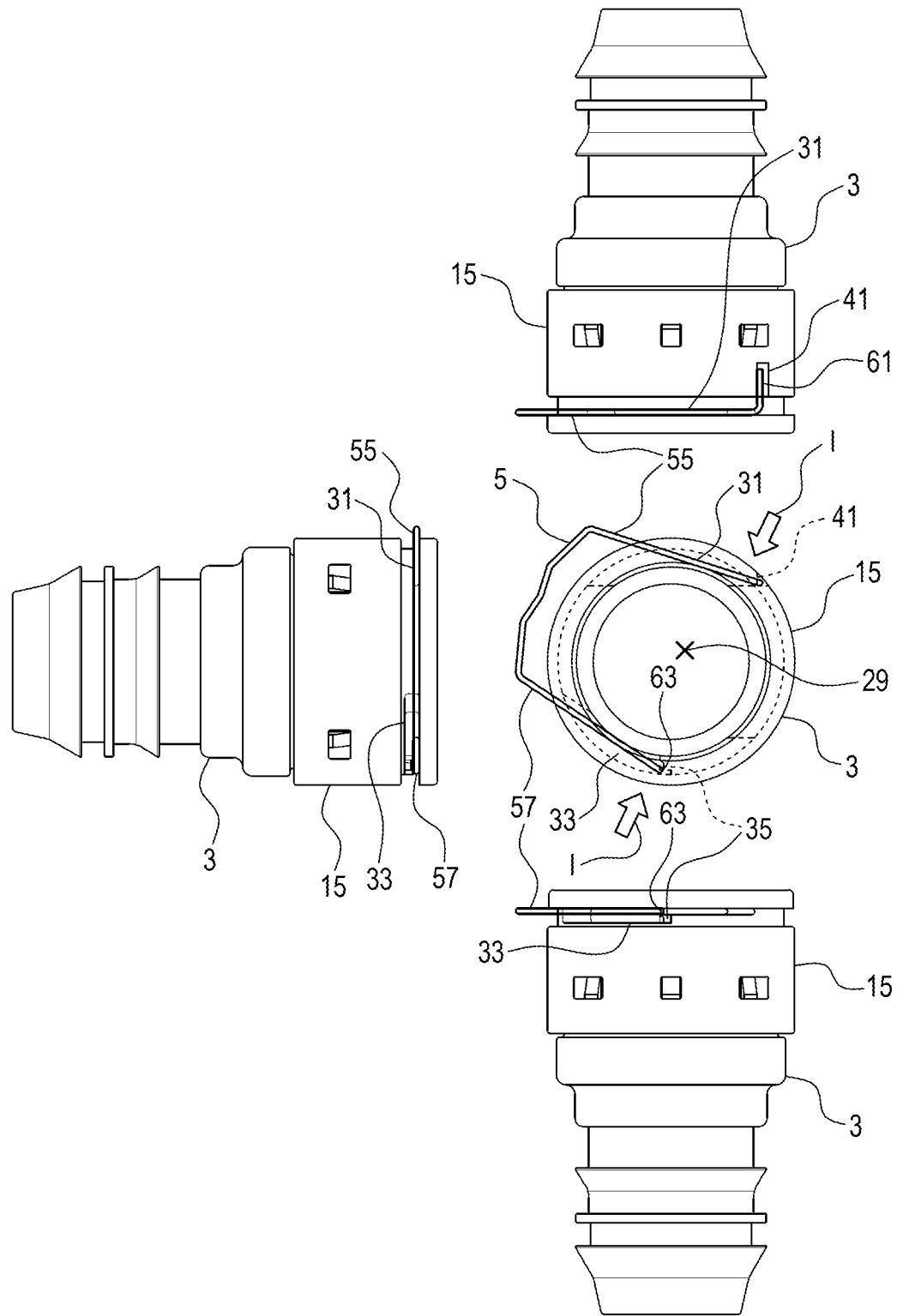
FIG. 14 is an explanatory diagram showing the configuration of the connector body and the retainer in a state where the bulge portion has passed through the retainer, and the first leg and the second leg move radially inward.

When the first pipe 7 is moved further in the axially backward direction B, and the bulge portion 11 passes the retainer 5, the first leg 55 moves radially in an inward direction I due to the restoring force generated by the elastic deformation as shown in the FIG. 14. The second leg 57 moves radially in the inward direction I and moves in the axially forward direction F due to the restoring force generated by the elastic deformation. At this time, the second end part 63 approaches the first end part 61 and moves in the axially forward direction F.

Figure 15:
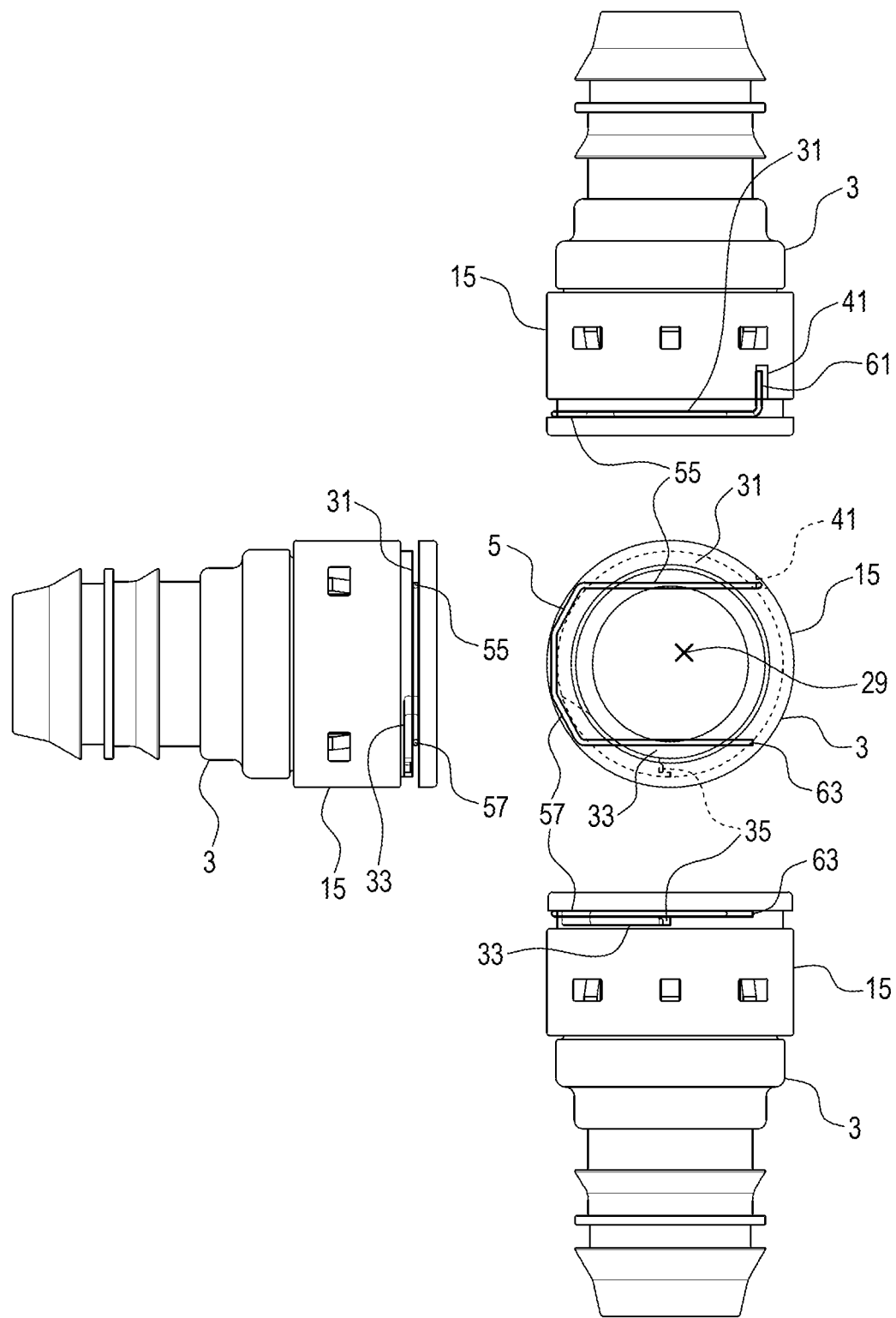
FIG. 15 is an explanatory diagram showing the configuration of the connector body and the retainer in a state where the first leg and the second leg restrict detachment of the first pipe.

As a result, the retainer 5 is brought into a state shown in FIG. 15. In the state shown in FIG. 15, the first leg 55 and the second leg 57 are positioned on the side of the axially forward direction F relative to the bulge portion 11 as shown in FIG. 2. The first leg 55 and the second leg 57 are positioned to overlap the bulge portion 11 when seen from the side of the axially forward direction F. Thus, the first leg 55 and the second leg 57 restrict detachment of the first pipe 7.

The position of the second end part 63 is a position (hereinafter referred to as a "restriction position") that is closer to the first end part 61 and is displaced in the axially forward direction F relative to the above-described temporary locking position. The restriction position is a position of the second end part 63 when the retainer 5 restricts detachment of the first pipe 7. The second leg 57 is inserted in the downward direction portion 33B shown in FIG. 5, FIG. 6, and FIG. 10. As a result of processes described above, the first pipe 7 is coupled to the connector 1.

3. Effects Achieved by Connector 1

(1A) In a state before coupling of the first pipe 7, the connector 1 temporarily locks the second end part 63 at the temporary locking position by means of the stepped face 35, the wall portion 45, and the wall portion 47. When the first pipe 7 is inserted into the insertion hole 29 while the second end part 63 is temporarily locked, the bulge portion 11 pushes the second leg 57 outward, and thus temporary locking of the second end part 63 is released. The second end part 63 moves to the restriction position due to the restoring force generated by the elastic deformation of the retainer 5. When the second end part 63 reaches the restriction position, the connector 1 is coupled with the first pipe 7.

The retainer 5 changes its position before and after coupling of the first pipe 7. A user can confirm whether the first pipe 7 is coupled by looking at the position of the retainer 5.

(1B) The first leg 55 and the second leg 57 in a state at the temporary locking position may be twisted with respect to an insertion direction of a pipe, instead of straightly facing the bulge portion 11. If the first leg 55 and the second leg 57 each have an angular cross section, angular portions or surface portions of the outer peripheral surfaces of the first leg 55 and the second leg 57 may contact the bulge portion 11 depending on respective degrees of twisting of the first leg 55 and the second leg 57. As a result, the first leg 55 and the second leg 57 may contact the bulge portion 11 in an unstable manner.

The first leg 55 and the second leg 57 each have a circular or elliptical cross section. Thus, regardless of how the first leg 55 and the second leg 57 are twisted, the outer peripheral surfaces of the first leg 55 and the second leg 57 always contact the bulge portion 11. Accordingly, the first leg 55 and the second leg 57 contact the bulge portion 11 in a linear contact manner, thereby achieving stable contact. Linear contact means that curved surfaces of the first leg 55 and the second leg 57 abut the bulge portion 11.

(1C) In the connector 1, structures related to positional changes of the retainer 5 are less likely to protrude around the connector 1. Accordingly, space-saving of the connector 1 can be achieved.

OTHER EMBODIMENTS

Although an embodiment of the present disclosure has been described above, the present disclosure is not limited to the above-described embodiment, but may be implemented in various modified forms.

Figure 16:
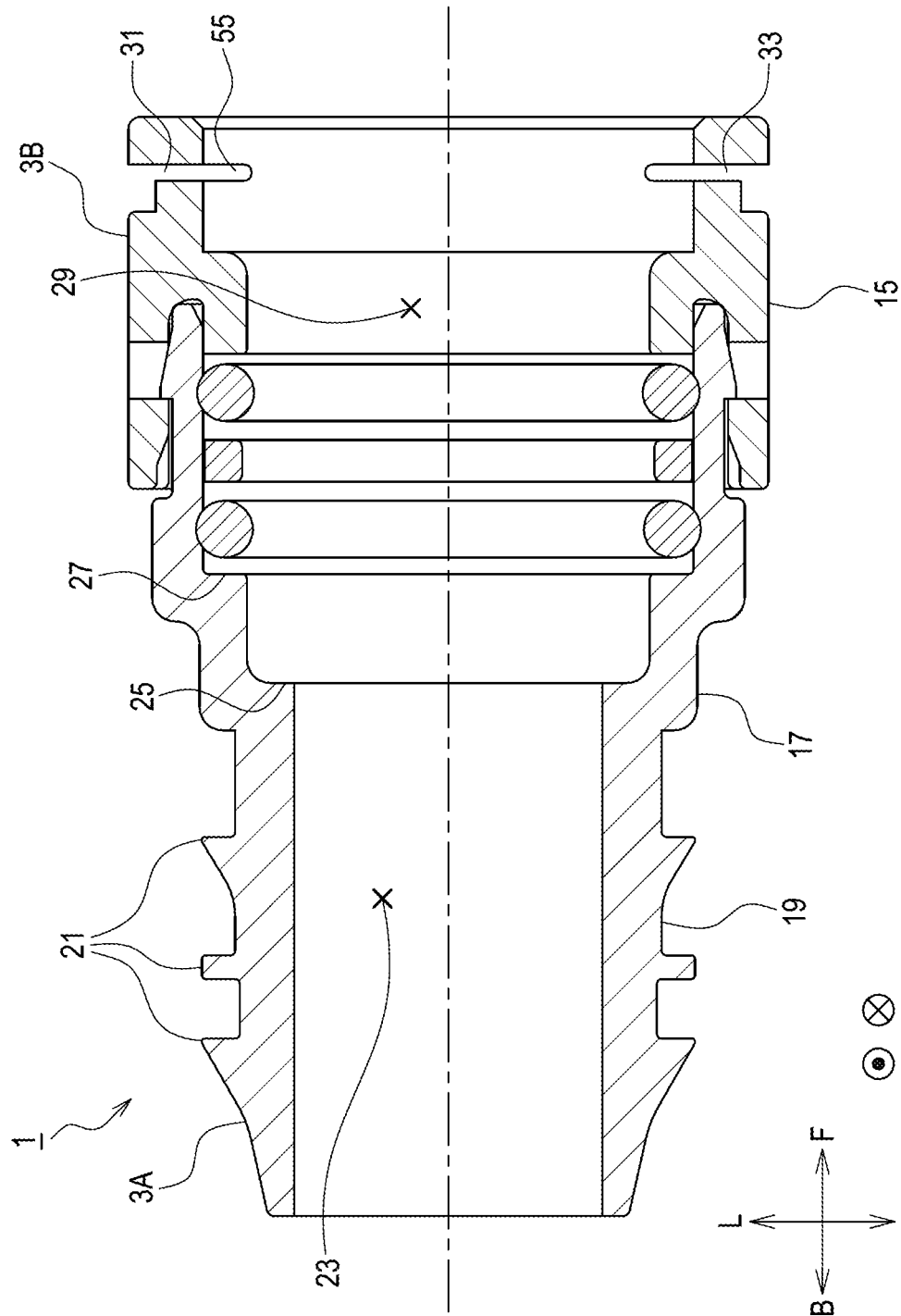
FIG. 16 is a sectional view showing a configuration of a connector body in another embodiment.

(1) As shown in FIG. 16, the connector body 3 may be configured with two divisible components combined together. The connector body 3 comprises an axially backward portion 3A and an axially forward portion 3B. A part of the axially backward portion 3A on the side of the axially forward direction F is inserted inside the axially forward portion 3B.

(2) A function performed by a single element in the above-described embodiments may be achieved by a plurality of elements, or a function performed by a plurality of elements may be achieved by a single element. Also, a part of a configuration in the above-described embodiments may be omitted. Further, at least a part of a configuration in each of the above-described embodiments may be added to, or may replace, a configuration in another one of the above-described embodiments.

(3) The present disclosure may be implemented in various forms, such as a system that includes the connector 1 as an element and a manufacturing method for the connector 1, other than the connector 1 described above.

The invention claimed is:

1. A connector for coupling with a first pipe having a bulge portion and with a second pipe, the connector comprising:
    a connector body; and
    an elastically deformable horseshoe-shaped retainer, wherein
    the connector body comprises:
        an insertion hole for insertion of the first pipe;
        a first opening communicating with the insertion hole from an outer peripheral surface of the connector body;
        a second opening communicating with the insertion hole from the outer peripheral surface of the connector body and opposed to the first opening; and
        a temporary locking portion,
    the retainer comprises:
        a first leg inserted in the first opening to abut a part of an outer peripheral surface of the first pipe, when coupled, on a side opposite to an insertion direction of the first pipe relative to the bulge portion, thereby restricting detachment of the first pipe; and
        a second leg inserted in the second opening to abut a part of the outer peripheral surface of the first pipe, when coupled, on the side opposite to the insertion direction of the first pipe relative to the bulge portion, thereby restricting detachment of the first pipe,
    the first leg of the retainer has a first end part fixed to the connector body,
    the temporary locking portion is configured to temporarily lock a second end part of the second leg of the retainer at a temporary locking position that is further separated from the first end part and is displaced in the insertion direction of the first pipe relative to a restriction position, which is a position of the second end part when the retainer restricts detachment of the first pipe, and
    the connector is configured such that, when the first pipe is inserted into the insertion hole in a state where the temporary locking portion temporarily locks the second end part, the bulge portion pushes the second leg outward, thereby releasing temporary locking of the second end part by the temporary locking portion, and the second end part moves to the restriction position due to a restoring force generated by elastic deformation of the retainer.

2. The connector according to claim 1, wherein the first leg and the second leg each have a circular or elliptical cross section.

3. The connector according to claim 2, wherein the temporary locking portion comprises a stepped face formed at an end face of the second opening on a side of the insertion direction of the first pipe, and
when the second end part is temporarily locked at the temporary locking position, the second end part is placed on the stepped face.

4. The connector according to claim 3, wherein the temporary locking portion comprises a wall portion formed at the stepped face, and
when the second end part is temporarily locked at the temporary locking position, the second end part is surrounded by the wall portion.

5. The connector according to claim 1, wherein the temporary locking portion comprises a stepped face formed at an end face of the second opening on a side of the insertion direction of the first pipe, and
when the second end part is temporarily locked at the temporary locking position, the second end part is placed on the stepped face.

6. The connector according to claim 5, wherein the temporary locking portion comprises a wall portion formed at the stepped face, and
when the second end part is temporarily locked at the temporary locking position, the second end part is surrounded by the wall portion.

\* \* \* \* \*